July 30, 1940. V. L. WHITACRE 2,209,547
INSULATED PIPE
Filed May 6, 1936
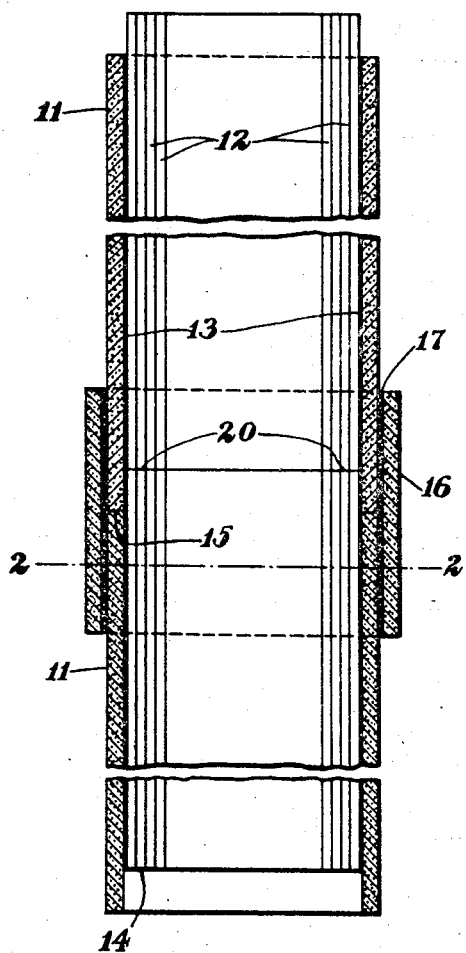
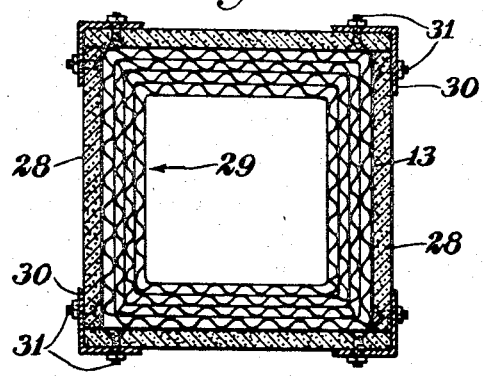
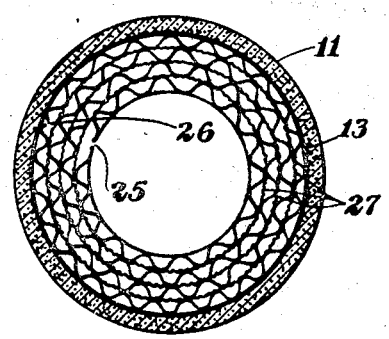
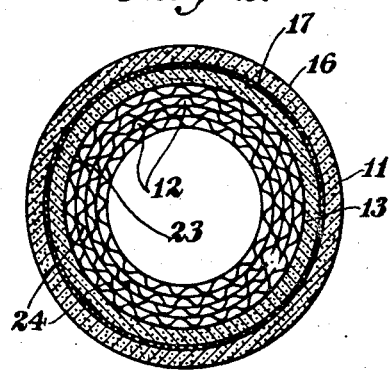

Patented July 30, 1940

2,209,547

UNITED STATES PATENT OFFICE 2,209,547

INSULATED PIPE

Verne L. Whitacre, Englewood, N. J., assignor to Johns-Manville Corporation, New York, N. Y., a corporation of New York Application May 6, 1936, Serial No. 78,131

2 Claims. (Cl. 138—86)

This invention relates to an insulated and protected pipe particularly for use in flues or the like.

The invention is of chief importance at this time in connection with the insulation and protection of pipes including a large proportion of an intimate mixture of Portland cement and asbestos fibres in strongly compressed and then hardened condition, referred to hereinafter as asbestos-cement pipes. For this reason, the invention will be illustrated particularly by description in connection with such pipes. However, other pipes may be used, as, for instance, those formed of metal or earthenware, when the particular features obtained by the combination of the asbestos-cement pipes and material applied thereto are not necessary in the finished assembly.

The invention comprises the hereinafter described novel features of the insulated pipe. Thus, the invention comprises asbestos-cement pipe and tubular thermal insulating and protecting material disposed as a lining within and secured to the said pipe. In the preferred embodiment, the article of the present invention includes asbestos-cement pipe, tubular protective insulation disposed concentrically therewithin and means securing the insulation substantially continuously to the pipe.

The invention is illustrated in the attached drawing and will be described for the purpose of exemplification in connection therewith.

Fig. 1 is a longitudinal sectional view of a plurality of composited tubes constructed individually and assembled in accordance with the present invention.

Fig. 2 is a sectional view on line 2—2 of Fig. 1.

Fig. 3 is a transverse sectional view of a modified form of composited duct.

Fig. 4 is a transverse sectional view of a modified form of composited tube.

There are shown sections 11 of rigid pipe, such as the asbestos-cement pipe described, and tubular thermal insulating and protecting material 12 disposed concentrically with respect to the said pipe and therewithin.

The said material is secured to the pipe substantially continuously, as by the cement 13.

The assembly described may be called a composited tube. It will be noted that, at one end of this tube, the protective insulation stops short of the adjacent end of the pipe, at position 14, whereas, at the other end of the tube, the insulation projects beyond the end of the pipe, as at 20, say, by an inch or so at each end. Adjoining sections of the composited tube meet at a joint 15 over which there is disposed a short section 16 of pipe of larger diameter, constituting a sleeve and defining with the joint portions of the said sections a space that is closed by a suitable calking composition 17.

At such a joint assembly, it will be noted, elements extend beyond the joint, both inside and outside, so that there is a very effective breaking of the joint, a result that is desirable in alining abutting sections of the pipe and in minimizing leakage of fluid, such as flue gas, that may be conveyed by the assembly. Such an assembly is particularly suitable for use as a stove pipe or smoke stack.

The general method of making the composited tube of the type described includes applying a hardenable cement to the outside of the tubular thermal insulation, maintaining the thus applied cementitious material in contact with the inside wall of a rigid pipe, and then hardening the cement, while maintaining the said contact.

The term "pipe" is used herein to include ducts of oval, rectangular, or other convenient shape of cross section. However, specially satisfactory results are obtained when the pipe that is insulated and protected is circular in cross section.

There is first provided the asbestos-cement pipe 11. Such pipes are known articles of commerce. They are made by forming an aqueous suspension of asbestos fibres and Portland cement, forming from the suspension a thin web or felt, winding a large number of such webs upon each other, on a rotating mandrel under substantial compression, and finally removing the thus spirally wound laminated material from the mandrel and hardening the Portland cement in the product.

The tubular insulation 12 may be of various kinds. If the insulation is to be subjected to elevated temperature, it may consist suitably of felted asbestos and/or rock wool fibres, preferably with a suitable binder resistant to the temperatures to which it is to be exposed, to form a thoroughly coherent sheet material. I have used to advantage, for this purpose, an insulation composed of composited non-conforming asbestos-containing sheets defining voids therebetween, say alternating plies of asbestos paper of plane and corrugated surfaces, 23 and 24, respectively. Such a composite may be thoroughly coated over its exterior and interior surfaces with an insoluble metal silicate formed in situ. Thus, zinc silicate or calcium silicate may be formed by coating the said surfaces with an aqueous composition including approximately equivalent proportions of sodium silicate and the finely divided oxide of the metal, the thus coated material being subjected eventually to drying, to remove water and harden the resulting silicate of calcium or zinc.

The cementitious material 13 is suitably in pasty form as applied to the surface of the tubular material 12. This cement may be applied in a thick layer, as, for example, about 1/16 inch or more in thickness. It should be adapted not to flow away from the position of application, even though the applied layer is thick, as stated. It should be hardenable, as by heating or drying. For this purpose, there may be used a lime-sand mortar with a substantial proportion of admixed fibres of chrysotile, crocidolite, amosite, or like reenforcing fibres to avoid cracking on drying. Or, there may be used a pasty mixture of lime and/or zinc oxide, asbestos fibres, sodium silicate, and water.

It will be seen that the sections of insulating material abut, as at position 20. Also, it is a necessary consequence of following the method described, including the use of the thick layer of pasty adhesive, that the adhesive layer is continuous between adjacent sections of the insulating material. In addition, the preferred insulating material is substantially gas-impermeable, that is, minimizes access of gas that may be passing inside the insulation to the pipe.

In the modification shown in Fig. 4, the tubular insulating and protecting material is readily expansible radially. The inner and outer sheets of paper of plane surface are severed longitudinally, as at positions 25 and 26, respectively. Also, crinkled paper 27 is preferably substituted for sheets of plane surface between the face and back of the said material.

When such a tube, coated over its exterior with a continuous thick layer of the pasty cement 13, is inserted within the section of rigid pipe, the assembly may be closed at both ends in any suitable manner and moderate air pressure introduced inside the tube, to cause radial expansion and forcing of the cement layer against the inside of the rigid pipe. The contact is maintained until the cement hardens to a degree adequate to adhere the insulation to the pipe. Then the pressure may be released, and hardening of the cement completed.

In an insulated and protected pipe of the kind described, there is effected sufficient thermal insulating to increase substantially and importantly the temperature of flue gases, rising through the pipe, for instance, with attendant increase in the draft on the furnace or stove producing the gas. Also, the pipe and the inner lining coact to give a strong durable assembly, the pipe providing rigidity to the structure and protecting the lining from mechanical injury and the lining protecting the pipe from corrosion by the flue gases or from other deleterious effects. Such a pipe maintains the insulating and protecting lining in established relationship to the pipe at all times, with the practical elimination of the slipping of the lining out of position, even in a vertically extending pipe line.

When the pipe is asbestos-cement and the lining and cement 13 are constituted as described, there is practically no tendency for the insulation and the pipe to separate from each other because of unequal coefficients of thermal expansion, even when the assembly is subjected during use to temperatures extending over a relatively wide range. An asbestos-cement pipe with an interiorly applied 1-inch lining of composited alternating corrugated and plane surfaced asbestos paper, with zinc silicate binder and with an asbestos and sodium silicate cement 13, has been found satisfactory for conducting flue gases at temperatures as high as 700° F.

The insulating material of kind described is somewhat yieldable without fracture. Thus, the insulation is not broken by unequal expansion in the assembly of pipe and said insulation.

For some purposes, a duct of square or rectangular cross section may be used. Such a structure is illustrated in Fig. 3, showing flat sheets 28 of asbestos and Portland cement or the like, flat sheets of insulating and protective material 29 such as composited corrugated and plane surfaced asbestos paper, and a cement 13 of the kind described securing the material 29 substantially continuously to the sheets 28, so that sagging of the said material away from the said sheets is prevented.

The composited material is then assembled, continuous angles 30 or the like and fasteners 31 being used.

The material 29 constitutes an inner insulating and protecting lining in the finished assembly.

The details given are for the purpose of illustration, not restriction. It is to be understood, therefore, that variations within the spirit of the invention are intended to be included within the scope of the appended claims.

What I claim is:

1. A flue section for conveying products of combustion, said section comprising a rigid pipe of a compressed and hardened asbestos-cement composition and a yieldable insulating and protective liner adhesively secured therewithin, the adhesive sealing the pipe against access of the products of combustion thereto, said liner including a plurality of composited layers comprising asbestos.

2. A flue section for conveying products of combustion, said section comprising a rigid pipe of a compressed and hardened asbestos-cement composition and a yieldable insulating and protective liner adhesively secured substantially continuously therewithin, said liner including a plurality of composited indented layers comprising asbestos.

VERNE L. WHITACRE.